United States Patent
Gleason et al.

(10) Patent No.: US 12,520,748 B2
(45) Date of Patent: Jan. 13, 2026

(54) CUTTING TOOL MOUNTED ON DIVIDER OF A HARVESTING HEADER

(71) Applicant: AGCO Corporation, Duluth, GA (US)

(72) Inventors: Tyler Gleason, Hesston, KS (US); Kye J Kurkowski, Hesston, KS (US); William H. Thompson, Hesston, KS (US); Randall Lohrentz, Buhler, KS (US)

(73) Assignee: AGCO Corporation, Duluth, GA (US)

( * ) Notice: Subject to any disclaimer, the term of this patent is extended or adjusted under 35 U.S.C. 154(b) by 966 days.

(21) Appl. No.: 17/754,105

(22) PCT Filed: Jun. 17, 2020

(86) PCT No.: PCT/IB2020/055636
§ 371 (c)(1),
(2) Date: Mar. 23, 2022

(87) PCT Pub. No.: WO2021/059028
PCT Pub. Date: Apr. 1, 2021

(65) Prior Publication Data
US 2022/0338411 A1    Oct. 27, 2022

Related U.S. Application Data

(60) Provisional application No. 62/904,781, filed on Sep. 24, 2019.

(51) Int. Cl.
*A01D 34/23* (2006.01)
*A01D 63/02* (2006.01)
(52) U.S. Cl.
CPC ............. *A01D 34/23* (2013.01); *A01D 63/02* (2013.01)

(58) Field of Classification Search
CPC ................................ A01D 34/23; A01D 63/02
See application file for complete search history.

(56) References Cited

U.S. PATENT DOCUMENTS 1,015,806 A    1/1912   Kluge
1,082,659 A *  12/1913  Swanson .............. A01D 34/831
                                                 56/245

(Continued)

FOREIGN PATENT DOCUMENTS

CN    107347379 A    11/2017
CN    109362340 A     2/2019

(Continued)

OTHER PUBLICATIONS

UK Intellectual Property Office, Search Report for related UK Application No. GB1917851.6, dated Jun. 5, 2020.

(Continued)

*Primary Examiner* — Joseph M Rocca
*Assistant Examiner* — Ashley A Kaercher

(57) ABSTRACT

A cutting tool for a harvesting header includes a longitudinal member having a straight portion with a non-round cross-section, a hook coupled to the longitudinal member and configured to secure the longitudinal member to a divider of a harvesting header, and a cutting blade extending from the longitudinal member. A harvesting header for use with a crop-harvesting machine includes a header frame structured to be coupled to the crop-harvesting machine, a divider at an end of the header frame, and a cutting tool carried by the divider. The divider defines a tube therein, and the longitudinal member of the cutting tool is disposed at least partially within the tube. A method of preparing a harvesting header includes sliding a longitudinal member of a cutting tool into a tube within a divider, and engaging a hook to secure the longitudinal member to the tube.

13 Claims, 8 Drawing Sheets

(56) References Cited

U.S. PATENT DOCUMENTS

| | | | |
|---|---|---|---|
| 1,108,536 A | 8/1914 | Wodtli | |
| 2,811,006 A | 10/1957 | Heth | |
| 3,058,330 A | 10/1962 | Grantham | |
| 3,885,377 A | 5/1975 | Jones | |
| 9,226,447 B2 | 1/2016 | Noll et al. | |
| 11,129,328 B2 * | 9/2021 | Remillard | A01D 61/00 |
| 12,201,056 B2 * | 1/2025 | Dudler | A01D 34/14 |
| 2013/0263566 A1 | 10/2013 | Lovett et al. | |
| 2014/0083074 A1 | 3/2014 | Kiel et al. | |
| 2021/0037712 A1 * | 2/2021 | Sorensen | A01D 63/04 |

FOREIGN PATENT DOCUMENTS

| | | |
|---|---|---|
| DE | 31 19 938 A1 | 12/1982 |
| DE | 202015006410 U1 * | 12/2016 |
| DE | 202016100325 U1 * | 6/2017 |
| EP | 2647276 A1 | 10/2013 |
| FR | 2182 293 A5 | 12/1973 |
| GB | 528491 A | 10/1940 |

OTHER PUBLICATIONS

European Patent Office, International Search Report for related International Patent Application No. PCT/IB2020/055636, dated Sep. 1, 2020.

* cited by examiner

CUTTING TOOL MOUNTED ON DIVIDER OF A HARVESTING HEADER

CROSS-REFERENCE TO RELATED APPLICATION

This application claims the benefit of the filing date of U.S. Provisional Patent Application 62/904,781, filed Sep. 24, 2019, the entire disclosure of which is incorporated herein by reference.

FIELD

This disclosure relates to harvesting headers for use with self-propelled crop-harvesting machines, and particularly to dividers having a vertical knife or sickle.

BACKGROUND

Self-propelled agricultural harvesters are well known and include, by way of example, combine harvesters, windrowers, and forage harvesters, all of which typically include a frame or chassis, an operator cab, an engine, and ground-engaging wheels or tracks. A cutting or pick-up header is often carried by the harvester, the header typically being considerably wider than the harvester and mounted to the front side of a feederhouse.

Crop material collected by the header is conveyed into the feederhouse before being conveyed in a generally rearward direction to crop-processing apparatus. In the case of a combine harvester, the processing apparatus serves to thresh the crop material and separate grain therefrom, whereas, in the case of a forage harvester or windrower, the crop material is typically passed through conditioning rollers.

Headers typically include a pair of crop dividers on opposite ends of a crop-gathering mechanism. The dividers divide and lift the crop, and guide it inwardly toward the crop-gathering mechanism, where it may be harvested by one or more harvesting tools, such as a set of oscillating blades. For harvesting certain crops, each divider may carry a knife or sickle, which may extend upward from the front of the divider. The knife or sickle may include an oscillating blade driven by the agricultural harvester.

BRIEF SUMMARY

In some embodiments, a cutting tool for a harvesting header includes a longitudinal member having a straight portion with a non-round cross-section, a hook coupled to the longitudinal member and configured to secure the longitudinal member to a divider of a harvesting header, and a cutting blade extending from the longitudinal member.

A harvesting header for use with a crop-harvesting machine includes a header frame structured to be coupled to the crop-harvesting machine, a divider at an end of the header frame, and a cutting tool carried by the divider. The cutting tool includes a longitudinal member having a straight portion with a non-round cross-section, a hook coupled to the longitudinal member and the tube and configured to secure the longitudinal member to the divider, and a cutting blade extending from the longitudinal member. The divider defines a tube therein, and the longitudinal member is disposed at least partially within the tube.

Some embodiments include a method of preparing a harvesting header having a header frame with a first divider and a second divider at opposite ends of the header frame. The method includes sliding a first longitudinal member of a first cutting tool into a first tube within the first divider, engaging a first hook to secure the first longitudinal member to the first tube, sliding a second longitudinal member of a second cutting tool into a second tube within the second divider, and engaging a second hook to secure the second longitudinal member to the second tube.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
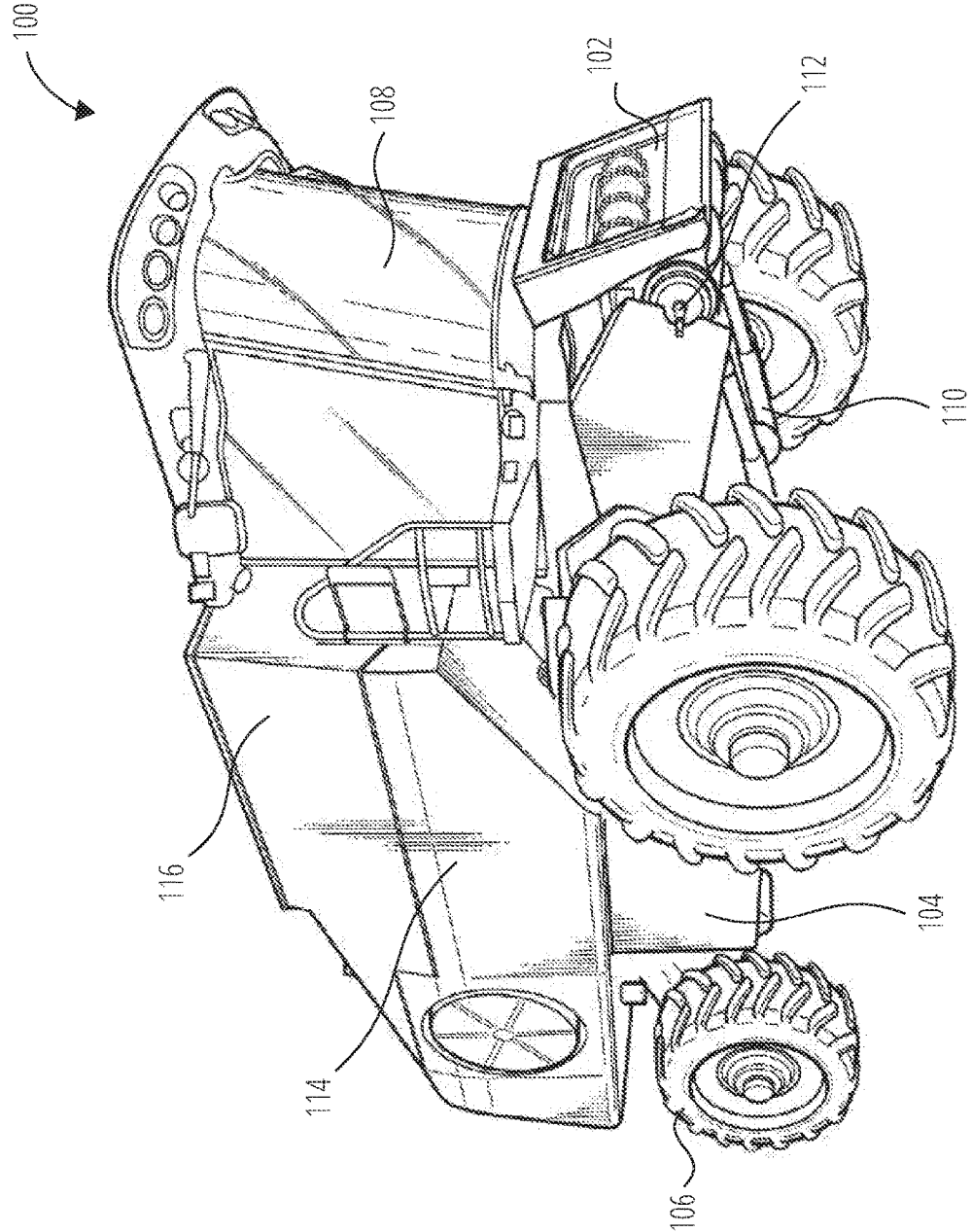
FIG. 1 is a simplified front perspective view of an example combine harvester.

The illustrations presented herein are not actual views of any header or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 illustrates an example agricultural harvester embodied as a combine harvester 100. In the context of the present disclosure, the example combine harvester 100 is merely illustrative, and other machines and/or implements with like functionality may deploy certain embodiments disclosed herein, such as windrowers, forage harvesters, etc. The example combine harvester 100 is shown in FIG. 1 without a header attached, and includes a feederhouse 102 carried by a chassis 104 supported by wheels 106. An operator cab 108 is mounted to the chassis 104. In some embodiments, other or additional forms of travel may be used, such as tracks. Hydraulic cylinders 110 are shown affixed to the underside of the feederhouse 102 on one end and to the chassis 104 on the other end. The feederhouse 102 may move (e.g., up and down, pitch, tilt, etc.) based on actuation of the hydraulic cylinders 110, which causes a detachably coupled header to also be raised, lowered, pitched, and/or tilted. A rotating support shaft 112 may be configured to provide mechanical power to a header during operation of the combine harvester 100. The rotating support shaft 112 may be configured to operate at various speeds, as described in, for example, U.S. Pat. No. 9,434,252, "Power Takeoff Drive System for a Vehicle," issued Sep. 6, 2016.

In general, the combine harvester 100 cuts crop materials (e.g., using the header), wherein the cut crop materials are delivered to the front end of the feederhouse assembly 200. Such crop materials are moved upwardly and rearwardly within and beyond the feederhouse 102 (e.g., by a conveyer) until reaching a processing system 114 that includes a thresher rotor. In one embodiment, the thresher rotor may comprise a single, transverse rotor, such as that found in a Gleaner® Super Series Combine by AGCO. Other designs may be used, such as axial-based, twin rotor, or hybrid designs. The thresher rotor processes the crop materials in known manner and passes a portion of the crop material (e.g., heavier chaff, corn stalks, etc.) toward the rear of the combine harvester 100 and another portion (e.g., grain and possibly light chaff) through a cleaning process. In the processing system 114, the crop materials undergo threshing and separating operations. In other words, the crop materials are threshed and separated by the thresher rotor operating in cooperation with well-known foraminous processing members in the form of threshing concave assemblies and separator grate assemblies, with the grain (and possibly light chaff) escaping through the concave assemblies and the grate assemblies and to a cleaning system beneath the processor to facilitate the cleaning of the heavier crop material. Bulkier stalk and leaf materials are generally retained by the concave assemblies and the grate assemblies and are discharged out from the processing system 114 and ultimately out of the rear of the combine harvester 100. The cleaned grain that drops to the bottom of the cleaning system is delivered by a conveying mechanism that transports the grain to an elevator, which conveys the grain to a grain bin 116 located at the top of the combine harvester 100. Any remaining chaff and partially or unthreshed grain is recirculated through the processing system 114 via a tailings return conveying mechanism. Because combine processing is known to those having ordinary skill in the art, further discussion thereof is omitted here for brevity. In embodiments in which the agricultural harvester is a windrower or forage harvester, the processing system 114 may include conditioning rollers rather than separation devices.

Figure 2:
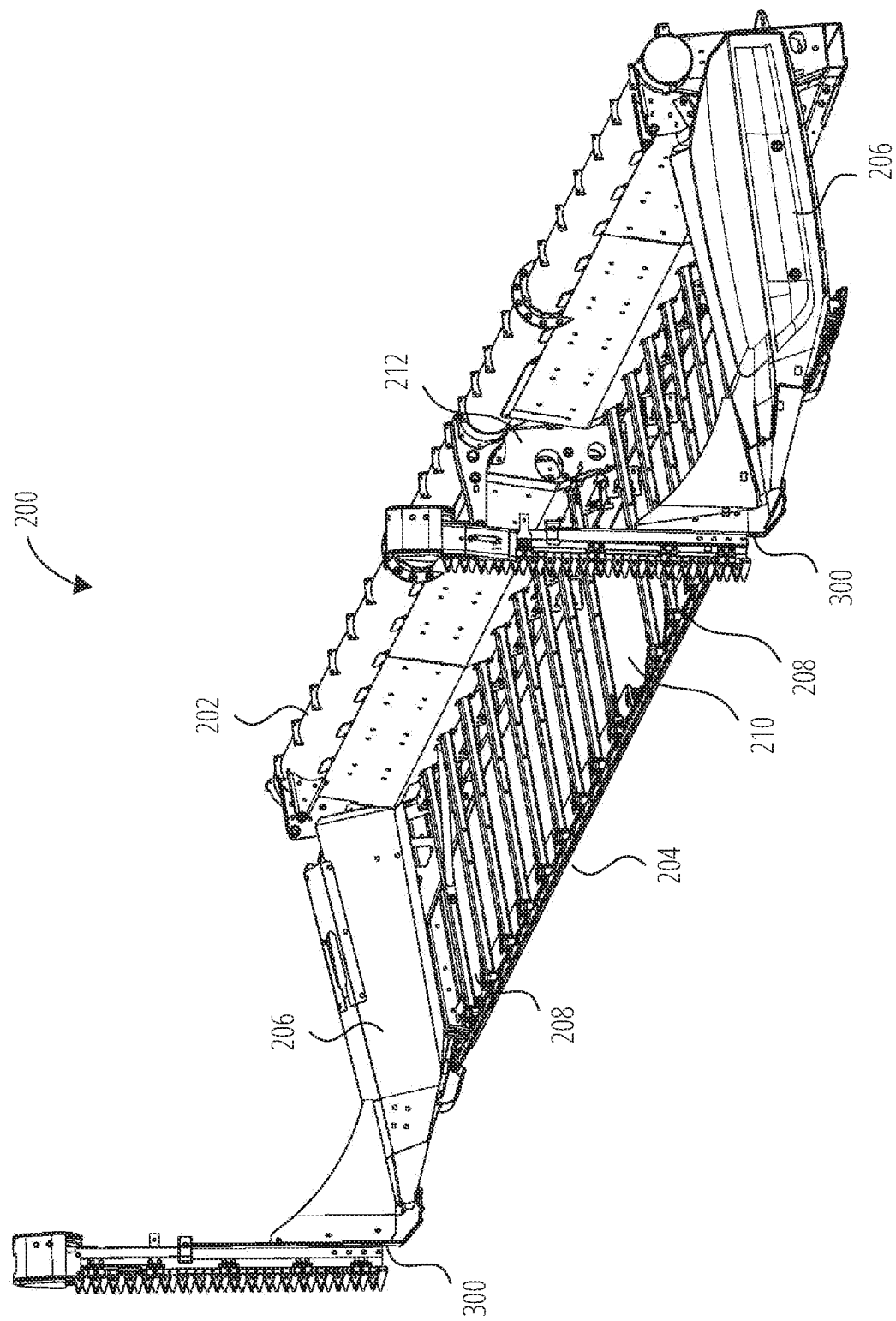
FIG. 2 illustrates a header that may be used with combine harvester of FIG. 1.

FIG. 2 is a simplified view of a header 200 that may be attached to the feederhouse 102 of the combine harvester 100 (FIG. 1) and used to harvest a crop. The header 200 includes a header frame 202, at least one harvesting tool 204, and dividers 206 at either end of the header 200, which may be fixed with respect to the header frame 202. The harvesting tool 204 is depicted as an oscillating blade, but may be any other tool used for harvesting crops that come into contact with the harvesting tool 204. The dividers 206 may serve to define boundaries between crop material being harvested and standing crop (typically, material to be harvested in a subsequent pass through the field) by directing crop material on one side of the divider 206 toward the harvesting tool 204 and crop material on the other side of the divider 206 away from the harvesting tool 204. Cutting tools 300 may be coupled to and carried by each of the dividers 206, may extend forward from the dividers 206, and may be configured to cut crop material that is not standing vertical (e.g., vines or other entangled material) at the ends of the header 200.

The header 200 may also include side drapers 208, a center draper 210, and/or a collecting auger 212 that together may transport cut crop material toward the feederhouse 102 of the combine harvester 100. Headers are described in more detail in, for example, U.S. Pat. No. 7,886,511, "Draper Head with Flexible Cutterbar Having Rigid Center Section," issued Feb. 15, 2011; U.S. Pat. No. 10,194,588, "Corn Header Configured to Reduce Kernel Losses," issued Feb. 5, 2019; and U.S. Pat. No. 8,857,143, "Frame for Harvesting Header with Continuous Section," issued Oct. 14, 2014.

Figure 3:
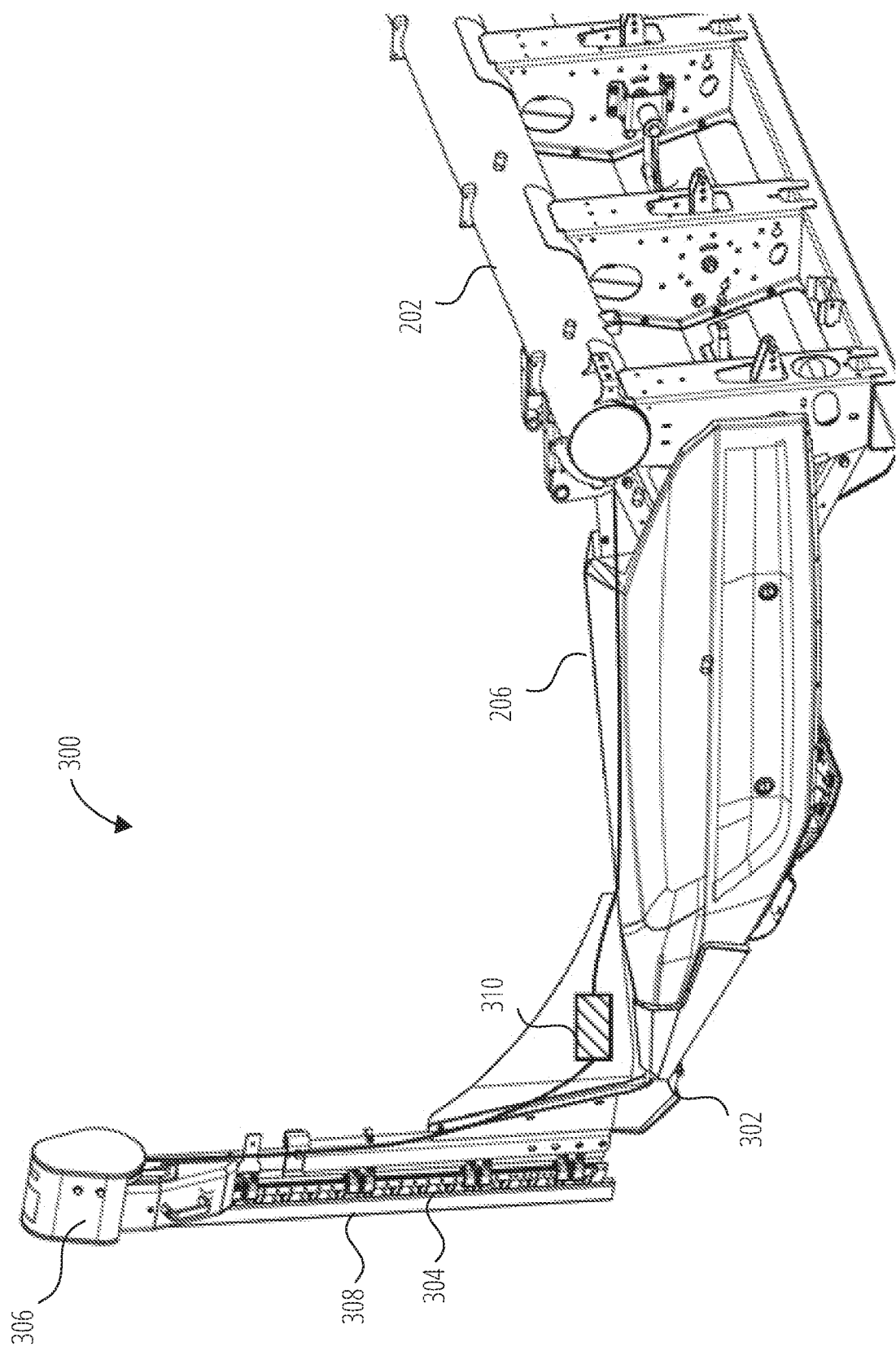
FIG. 3 is a simplified perspective view of a divider of the header shown in FIG. 2 and a cutting tool attached to the divider.

FIG. 3 is a simplified perspective view showing more detail of one divider 206 and one cutting tool 300 of the header 200 shown in FIG. 2. The cutting tool 300 may include a longitudinal member 302 secured to the divider 206. For example, the longitudinal member 302 may slide into a slot within the divider 206. The cutting tool 300 may include a cutting blade 304, such as a vertical oscillating blade (depicted in FIG. 3 with a protective cover 308) driven by an electric motor 306. The electric motor 306 may be connected to a power source on the header 200 or the combine harvester 100 by appropriate wiring, such as a wiring harness 310 that can be connected and disconnected without tools. In some embodiments, the cutting blade 304 may be driven by other means, such as by a drive shaft or pressurized fluid.

The cutting blade 304 may be designed and arranged to divide and cut crop material vertically and direct crop material to be harvested toward the harvesting tool 204 (FIG. 2), while directing other crop material away from the harvesting tool 204 (typically crop material which will be cut on another pass of the combine harvester 100 through the field). The cutting blade 304 may help to separate crop material that is entangled, and which might otherwise jam the harvesting tool 204 if not properly divided and cut.

Figure 4:
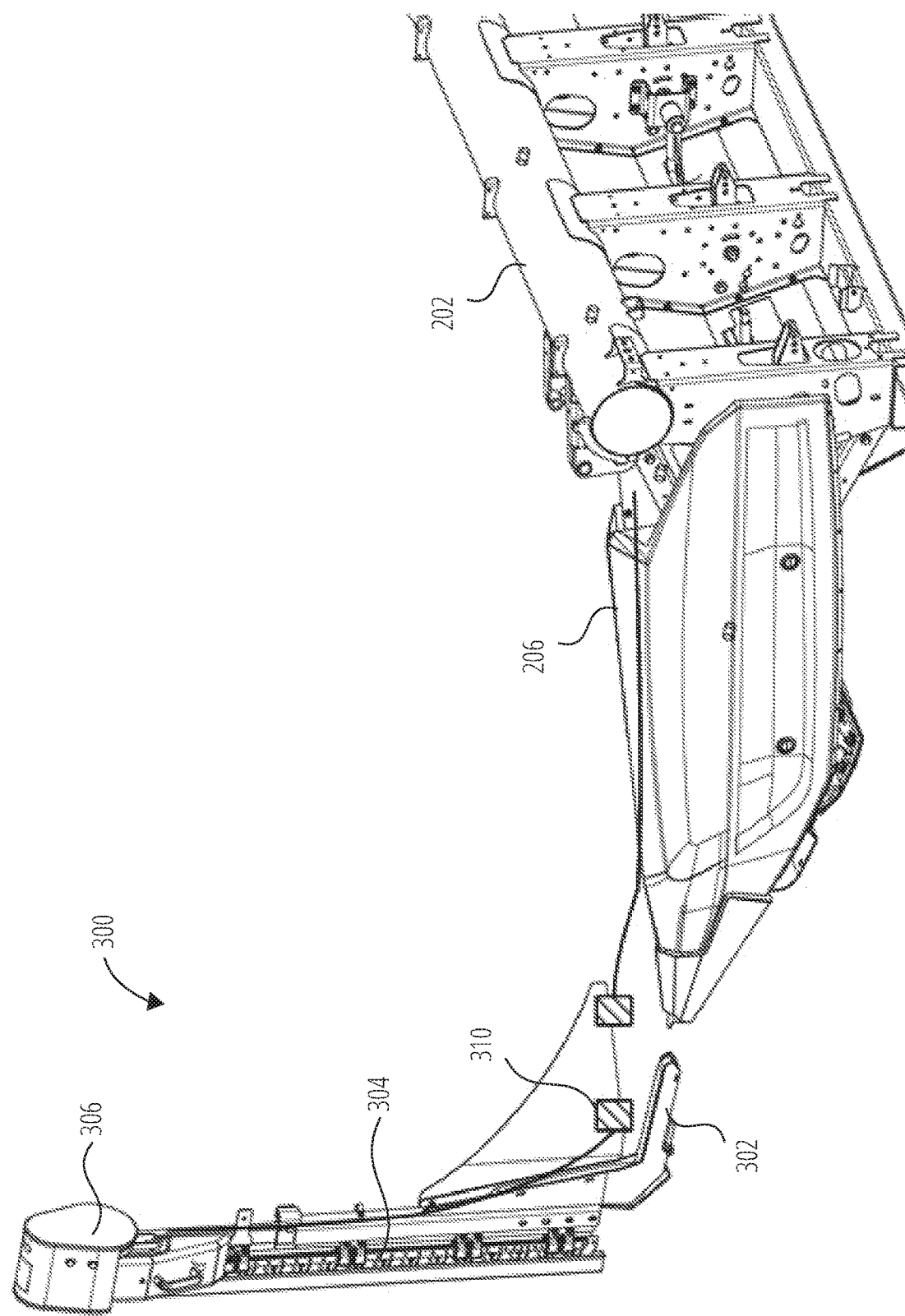
FIG. 4 is a simplified perspective view of the divider and cutting tool shown in FIG. 3 with the cutting tool detached from the divider.

FIG. 4 is a simplified perspective view showing the cutting tool 300 removed from the divider 206. The cutting tool 300 may be removed as shown for service, transport, or to replace the cutting tool 300 with another type of tool or divider point (e.g., to harvest different types of crops).

Figure 5:
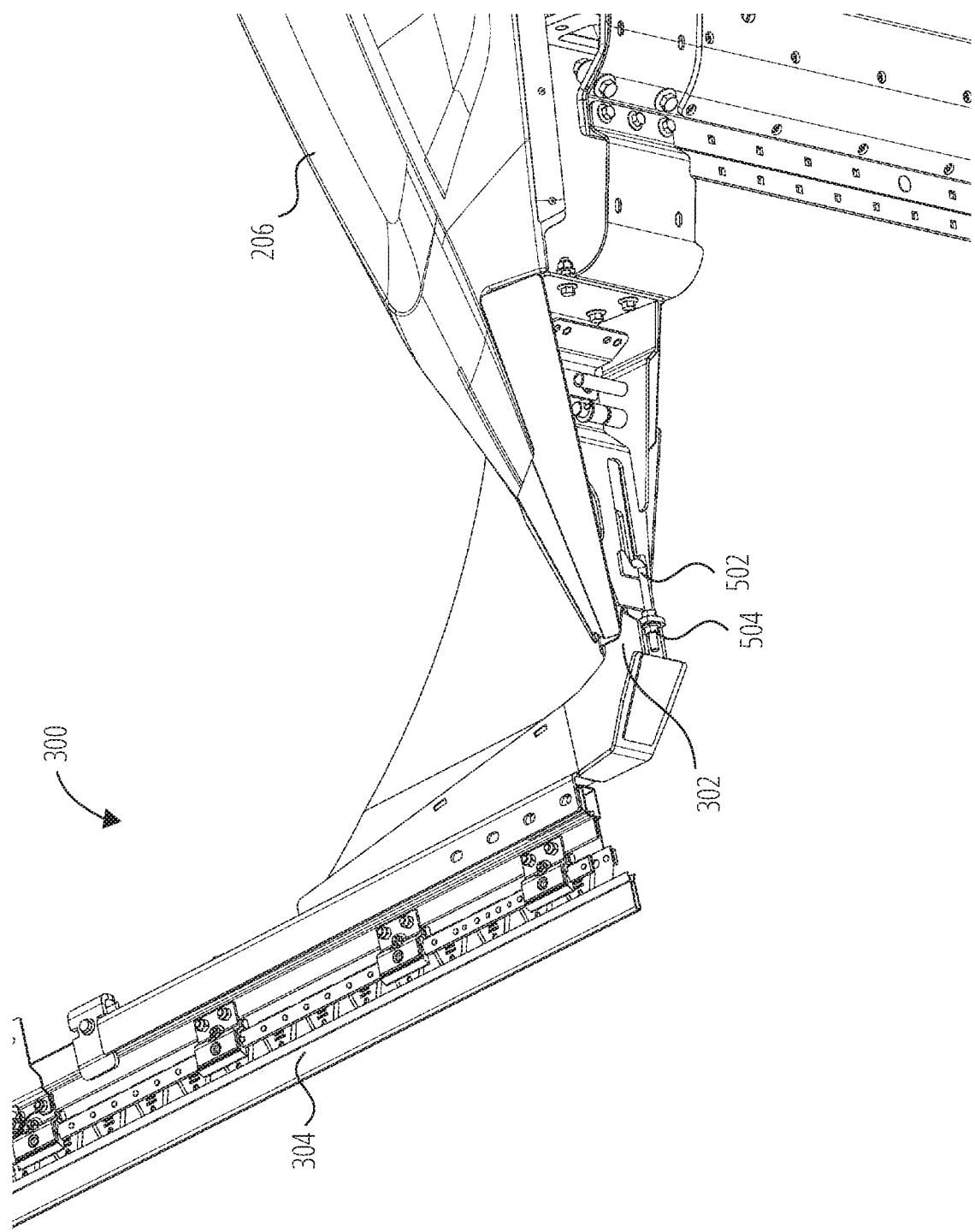
FIG. 5 is a simplified perspective view of the divider and cutting tool shown in FIG. 3 from another angle.

FIG. 5 is another view of a portion of the cutting tool 300 connected to the divider 206. The cutting tool 300 may include a hook 502 coupled to the longitudinal member 302 to secure the cutting tool 300 to the divider 206. For example, and as shown, the hook 502 may include a threaded shaft secured to the longitudinal member 302 by one or more nuts 504.

Figure 6:
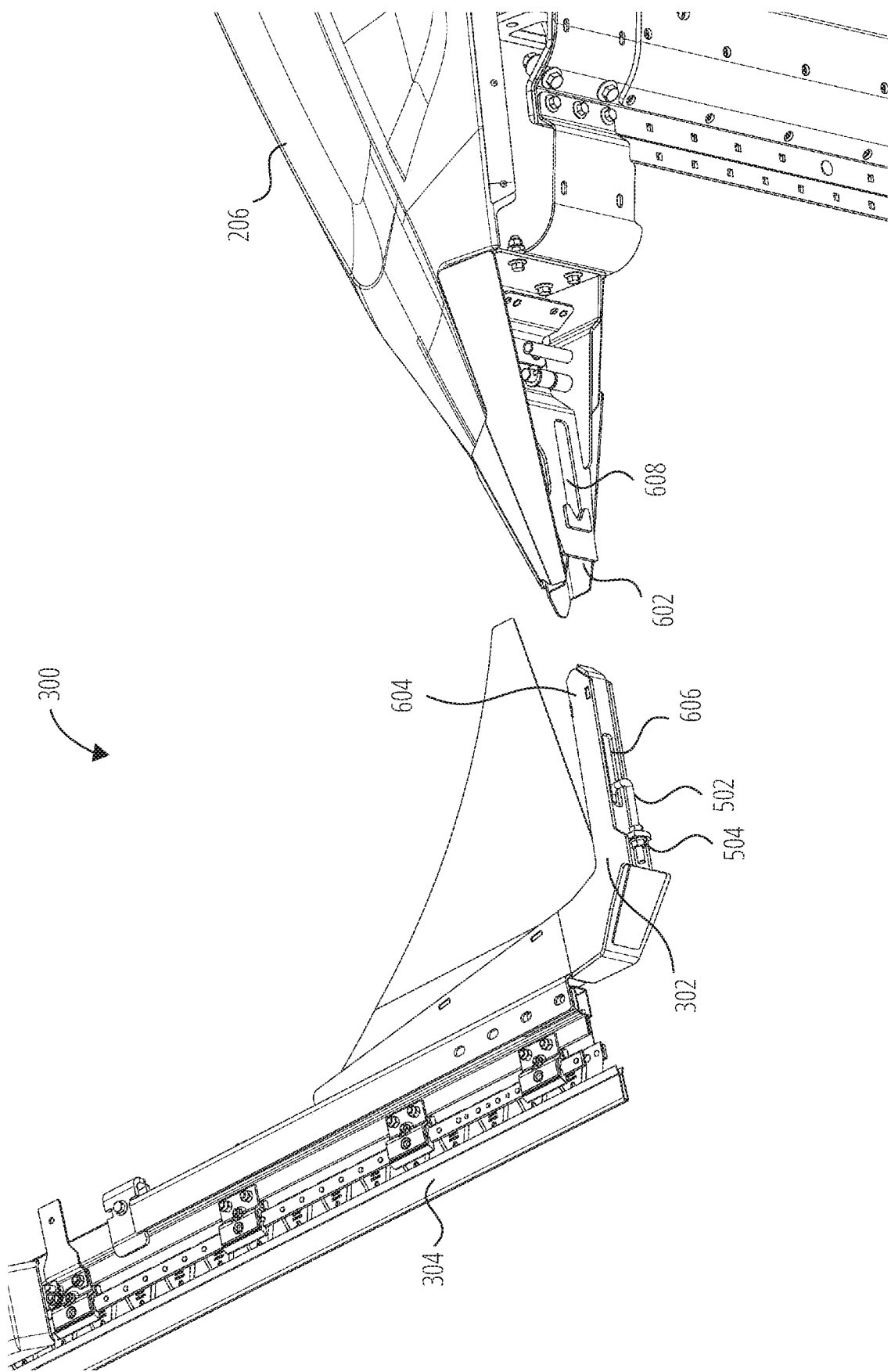
FIG. 6 is a simplified perspective view of the divider and cutting tool from the same angle as in FIG. 5 with the cutting tool detached from the divider.

FIG. 6 is a view of from the perspective of FIG. 5 of the cutting tool 300 removed from the divider 206. As shown, the cutting blade 304 may be oriented in a direction approximately perpendicular the longitudinal member 302. Thus, when installed in the divider 206, the longitudinal member 302 may be oriented generally parallel to a direction of travel, and the cutting blade 304 may be oriented generally vertical (recognizing that the header 200 itself may change direction based on field conditions, terrain, etc.)

The divider 206 may define a tube 602 therein to receive the longitudinal member 302.

The divider 206 has a hollow tube 602 in a forward end thereof, and the longitudinal member 302 is sized to fit within the tube 602. The longitudinal member 302 may be a solid shaft or a hollow tube. Thus, the cutting tool 300 can be connected to the divider 206 by sliding the longitudinal member 302 into the tube 602. The tube 602 and longitudinal member 302 may each have a corresponding non-round cross-section, such that the longitudinal member 302 does not rotate within the tube 602.

The longitudinal member 302 is depicted in FIG. 6 as having a rectangular cross-section. Such a cross-section may provide stability and help keep the longitudinal member 302 (and therefore the cutting blade 304) oriented with respect to the header 200. In other embodiments, the longitudinal member 302 may have keyways, splines, hexagon cross-sections, obround shapes, or any other shapes or obstructions to prevent rotation of the longitudinal member 302 within the tube 602.

In some embodiments, and as shown in FIG. 6, the longitudinal member 302 may have at least one outer wall 604 defining a hollow cavity. For example, the outer wall 604 may be formed from plate steel, an extruded steel channel, etc. The outer wall 604 may also define a slot 606 therein through which the hook 502 can attach to the divider 206. In other embodiments, a portion of the outer wall 604 may be omitted, such that the slot 606 is not required. For example, the outer wall 604 may have a cross-section in the shape of the letter 'U,' with the open side oriented downward.

The divider 206 may also have a slot 608 therein, approximately corresponding to the position of the slot 606 in the longitudinal member 302 when the longitudinal member 302 is installed in the tube 602. Thus, the hook 502 may attach to the divider 206 through the slot 606 and the slot 608.

In some embodiments, the divider 206 may include a spring-loaded latch as shown and described in U.S. Provisional Patent Application 62/878,042, "Divider Points, Harvesting Headers Configured to Receive Removable Divider Points, and Related Methods," filed Jul. 24, 2019. The longitudinal member 302 may be configured to slide into the tube 602 without engaging the spring-loaded latch. In particular, the slot 606 may not extend to the point where the latch could engage the longitudinal member 302. Thus, the cutting tool 300 may be removed by a single person using both hands to control the outward movement of the cutting tool 300, and the person need not simultaneously disengage the latch. The hook 502 and nut(s) 504 may perform the function of securing the cutting tool 300 to the divider 206. A benefit of providing the hook 502 and nut(s) 504, even if a latch is present in the divider 206, is that the hook 502 may be relatively more secure than the latch would be. Because the cutting tool 300 may typically be heavier than some divider points disclosed in U.S. Provisional Patent Application 62/878,042, the spring-loaded latch therein may be insufficient to keep the cutting tool 300 from wobbling on the divider 206. However, the divider 206 may carry various divider points or cutting tools, based on different crops to be cut, and so it may be beneficial to be able to connect different tools or divider points using different means. That is, when installing or removing a lightweight divider point, a person can easily slide the divider point into or out of the tube 602, pushing the latch as necessary with a hand (i.e., the process can be performed in one motion without any tools). When installing or removing a heavier or cumbersome cutting tool 300 as disclosed herein, the person can use both hands to steady and align the longitudinal member 302, and may secure or detach the cutting tool 300 with the hook 502 in a separate action (with or without a wrench, as appropriate). Because the divider 206 may be used with various different divider points and cutting tools, different attachment mechanisms may expedite configuration changes yet allow for securely attaching the different divider points and cutting tools.

Figure 7:
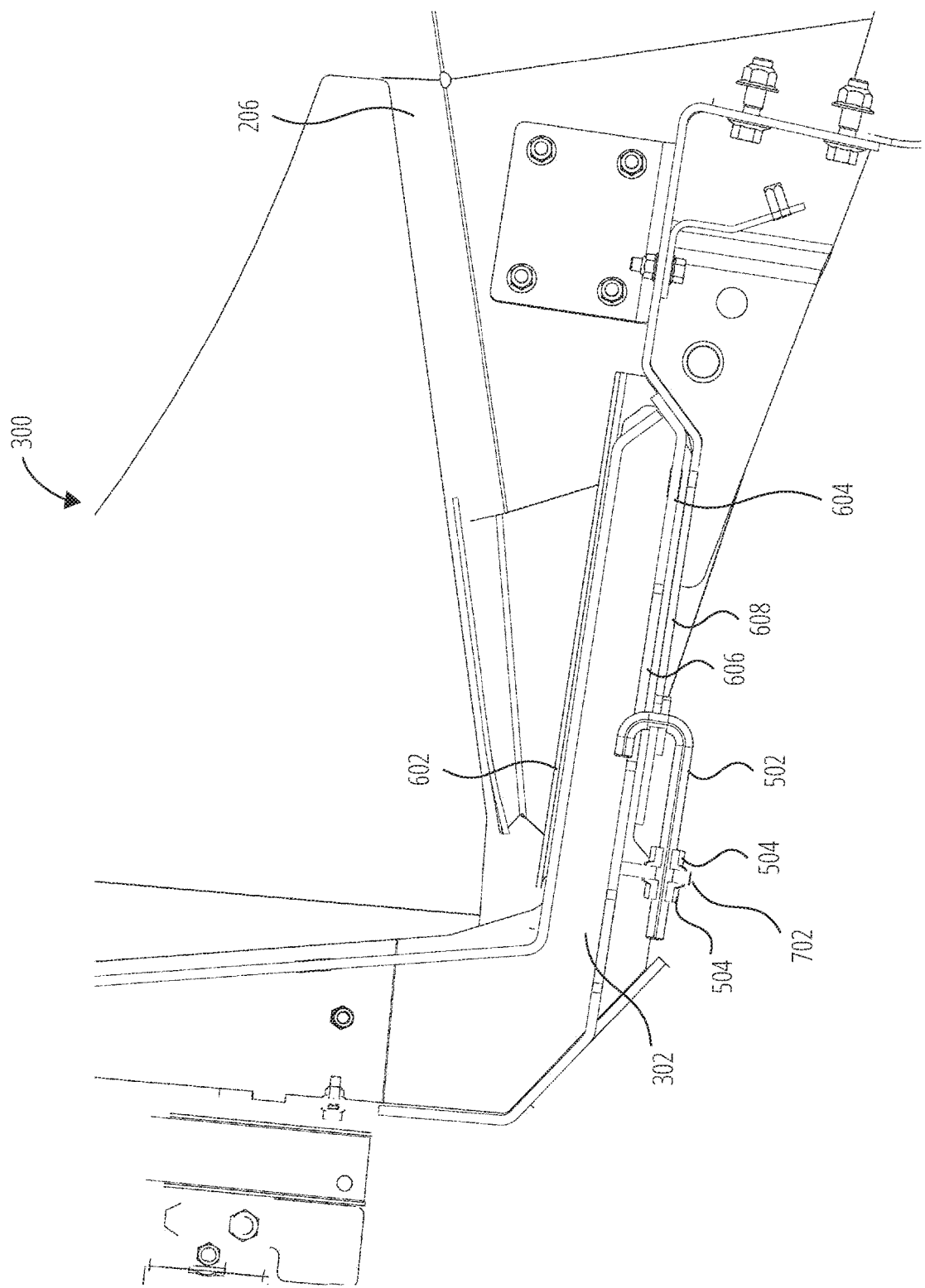
FIG. 7 is a simplified cross-sectional view of the divider and cutting tool shown in FIG. 3.

FIG. 7 is a simplified cross-section view of the cutting tool 300 connected to the divider 206. As shown, the hook 502 passes through the slot 606 in the longitudinal member 302 and the slot 608 in the tube 602, and is secured in place by the nut(s) 504. FIG. 7 shows two nuts 504 tightened against a bracket 702 connected to the longitudinal member 302. Thus, to install the cutting tool 300 to the divider 206, an operator may slide the longitudinal member 302 into the tube 602. The operator may then move the hook 502 to rest within the slot 608 defined by the tube 602 (and, if present, the slot 606 defined by the longitudinal member 302), and secure the hook 502 by turning the nut(s) 504. The nut(s) 504 may be tightened with a wrench, or may include ribs or other features to enable tightening by hand, without tools.

Figure 8:
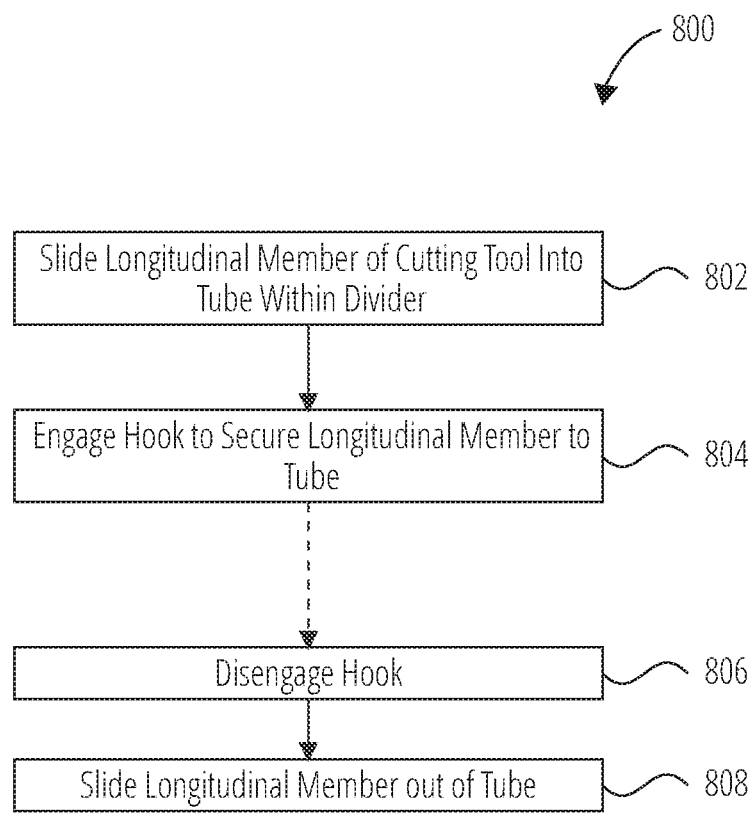
FIG. 8 is a simplified flow chart illustrating a method of preparing, transporting, and/or operating a combine harvester and harvesting header.

FIG. 8 is a simplified flow chart illustrating a method 800 of preparing, transporting, and/or operating a combine harvester and harvesting header, such as the combine harvester 100 shown in FIG. 1 and header 200 shown in FIG. 2. As shown in block 802, a longitudinal member of a cutting tool slides into a tube within the divider. In block 804, a hook engages to secure the longitudinal member to the tube. These actions may be repeated with a second cutting tool. After any protective covers are removed, the harvesting header is then ready for use in harvesting a crop. After harvesting, protective covers may optionally be installed. As shown in block 806, the hook is disengaged. In block 808, the longitudinal member slides out of the tube. These actions, likewise, may be repeated to remove a second cutting tool. The harvesting header is then ready to receive divider points, be loaded onto a trailer for transport, be stored, etc.

Additional non-limiting example embodiments of the disclosure are described below.

Embodiment 1: A cutting tool for a harvesting header comprising a longitudinal member having a straight portion with a non-round cross-section, a hook coupled to the longitudinal member and configured to secure the longitudinal member to a divider of a harvesting header, and a cutting blade extending from the longitudinal member.

Embodiment 2: The cutting tool of Embodiment 1, wherein the longitudinal member exhibits a rectangular cross-section.

Embodiment 3: The cutting tool of Embodiment 1 or Embodiment 2, wherein the longitudinal member comprises an outer wall defining a hollow cavity therein.

Embodiment 4: The cutting tool of Embodiment 3, further comprising a slot formed through the outer wall of the longitudinal member.

Embodiment 5: The cutting tool of Embodiment 1 or Embodiment 2, wherein the longitudinal member comprises a solid shaft.

Embodiment 6: The cutting tool of any one of Embodiment 1 through Embodiment 5, wherein the cutting blade has a major axis oriented in a direction approximately perpendicular to the longitudinal member.

Embodiment 7: The cutting tool of any one of Embodiment 1 through Embodiment 6, wherein the cutting blade comprises an oscillating blade.

Embodiment 8: The cutting tool of Embodiment 7, further comprising an electric motor configured to drive the oscillating blade.

Embodiment 9: The cutting tool of Embodiment 8, further comprising a wiring harness connected to the electric motor and configured to be connected to a power supply of the harvesting header.

Embodiment 10: The cutting tool of any one of Embodiment 1 through Embodiment 9, further comprising a nut configured to secure the hook against the divider.

Embodiment 11: A harvesting header for use with a crop-harvesting machine comprising a header frame structured to be coupled to the crop-harvesting machine, a divider at an end of the header frame, and a cutting tool carried by the divider. The cutting tool comprises a longitudinal member having a straight portion with a non-round cross-section, a hook coupled to the longitudinal member and the tube and configured to secure the longitudinal member to the divider, and a cutting blade extending from the longitudinal member. The divider defines a tube therein, and the longitudinal member is disposed at least partially within the tube.

Embodiment 12: The harvesting header of Embodiment 11, wherein the tube and the longitudinal member each exhibit rectangular cross-sections.

Embodiment 13: The harvesting header of Embodiment 11 or Embodiment 12, wherein the tube has a slot formed in a wall thereof, and wherein the hook extends through the wall.

Embodiment 14: The harvesting header of any one of Embodiment 11 through Embodiment 13, wherein the cutting tool comprises an electric motor configured to drive the cutting blade.

Embodiment 15: The harvesting header of Embodiment 14, wherein the electric motor is configured to draw power from the harvesting header via a wiring harness.

Embodiment 16: A method of preparing a harvesting header having a header frame comprising a first divider and a second divider at opposite ends of the header frame. The method comprises sliding a first longitudinal member of a first cutting tool into a first tube within the first divider, engaging a first hook to secure the first longitudinal member to the first tube, sliding a second longitudinal member of a second cutting tool into a second tube within the second divider, and engaging a second hook to secure the second longitudinal member to the second tube.

Embodiment 17: The method of Embodiment 16, wherein engaging a first hook comprises screwing a nut along a threaded shaft of the first hook.

Embodiment 18: The method of Embodiment 16 or Embodiment 17, wherein sliding a first longitudinal member of a first cutting tool into a first tube and sliding a second longitudinal member of a second cutting tool into a second tube each comprise installing the cutting tools on the harvesting header by a single person.

Embodiment 19: The method of any one of Embodiment 16 through Embodiment 18, further comprising removing protective covers from each of the first cutting tool and the second cutting tool.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. A harvesting header for use with a crop-harvesting machine, the harvesting header comprising:
   a header frame structured to be coupled to the crop-harvesting machine;
   a divider at an end of the header frame, the divider defining a tube therein, wherein the tube has a slot formed in a wall thereof;
   a cutting tool carried by the divider, the cutting tool comprising:

a longitudinal member having a straight portion with a non-round cross-section;

a cutting blade extending from the longitudinal member; and a hook coupled to the longitudinal member and configured to secure the longitudinal member to a divider of a harvesting header, wherein the hook extends through the wall.

2. The harvesting header of claim 1, wherein the longitudinal member exhibits a rectangular cross-section.

3. The harvesting header of claim 1, wherein the longitudinal member comprises an outer wall defining a hollow cavity therein.

4. The harvesting header of claim 1, further comprising a slot formed through the outer wall of the longitudinal member.

5. The harvesting header of claim 1, wherein the longitudinal member comprises a solid shaft.

6. The harvesting header of claim 1, wherein the cutting blade has a major axis oriented in a direction approximately perpendicular to the longitudinal member.

7. The harvesting header of claim 1, wherein the cutting blade comprises an oscillating blade.

8. The harvesting header of claim 1, further comprising an electric motor configured to drive the oscillating blade.

9. The harvesting header of claim 8, further comprising a wiring harness connected to the electric motor and configured to be connected to a power supply of the harvesting header.

10. The harvesting header of claim 1, further comprising a nut configured to secure the hook against the divider.

11. The harvesting header of claim 1, wherein the tube and the longitudinal member each exhibit rectangular cross-sections.

12. The harvesting header of claim 1, wherein the cutting tool comprises an electric motor configured to drive the cutting blade.

13. The harvesting header of claim 12, wherein the electric motor is configured to draw power from the harvesting header via a wiring harness.

* * * * *